United States Patent [19]

Aihara et al.

[11] Patent Number: 5,869,577
[45] Date of Patent: Feb. 9, 1999

[54] FLOURINE-CONTAINING ELASTIC COPOLYMER EXCELLENT IN MOLDING PROCESSABILITY, PREPARATION PROCESS THEREOF AND VULCANIZABLE COMPOSITION EXCELLENT IN MOLDING PROCESSABILITY

[75] Inventors: Hiroshi Aihara; Tatsuya Morikawa; Hiroyuki Tanaka; Mitsuru Kishine, all of Settsu, Japan

[73] Assignee: Daikin Industries, Ltd., Osaka, Japan

[21] Appl. No.: 849,551

[22] PCT Filed: Dec. 4, 1995

[86] PCT No.: PCT/JP95/02485

§ 371 Date: Jun. 2, 1997

§ 102(e) Date: Jun. 2, 1997

[87] PCT Pub. No.: WO96/17876

PCT Pub. Date: Jun. 13, 1996

[30] Foreign Application Priority Data

Dec. 6, 1994 [JP] Japan .................................. 6-302487

[51] Int. Cl.$^6$ ................................... C08F 259/00
[52] U.S. Cl. ............................... 525/276; 525/243
[58] Field of Search ....................... 525/276, 243

[56] References Cited

U.S. PATENT DOCUMENTS

| | | | |
|---|---|---|---|
| 3,929,934 | 12/1975 | Moore et al. | 525/276 |
| 4,141,874 | 2/1979 | Oka et al. . | |
| 4,859,745 | 8/1989 | Carl et al. | 525/276 |
| 4,946,900 | 8/1990 | Blaise et al. | 525/276 |
| 5,010,121 | 4/1991 | Yeates et al. | 525/276 |
| 5,093,427 | 3/1992 | Barber | 525/276 |
| 5,095,081 | 3/1992 | Bacque et al. | 526/216 |
| 5,218,026 | 6/1993 | Toda et al. | 525/276 |

FOREIGN PATENT DOCUMENTS

| | | | |
|---|---|---|---|
| 2737871 | 3/1978 | Germany | 525/276 |
| 52-62391 A | 5/1977 | Japan . | |
| 52-76359 A | 6/1977 | Japan . | |
| 52-84271 A | 7/1977 | Japan . | |
| 55-131037 | 10/1980 | Japan | 525/276 |
| 55-131038 | 10/1980 | Japan | 525/276 |
| 59-52903 B2 | 12/1984 | Japan . | |
| 61-278520 | 12/1986 | Japan | 525/276 |
| 52-138547 A | 6/1987 | Japan . | |
| 63-286410 A | 11/1988 | Japan . | |
| 63-304012 A | 12/1988 | Japan . | |
| 2-117945 A | 5/1990 | Japan . | |
| 2-124910 A | 5/1990 | Japan . | |
| 3269008 | 11/1991 | Japan | 525/276 |
| 4-268357 A | 9/1992 | Japan . | |
| 2208513 | 4/1989 | United Kingdom | 525/276 |

Primary Examiner—Bernard Lipman
Assistant Examiner—N. Sarofim
Attorney, Agent, or Firm—Kubovcik & Kubovcik

[57] ABSTRACT

The present invention provides the fluorine-containing elastic copolymer which is excellent in molding processability, particularly molding stability and further vulcanization properties, flowability at molding and compression set of a vulcanized rubber. The copolymer is prepared through emulsion polymerization of vinylidene fluoride and at least one of other monomers in two polymerization stages by using a water-soluble radical polymerization initiator in a very small amount of 0.001 to 0.03% by weight based on the total weight of copolymers prepared in the two stages and an oil-soluble radical polymerization initiator. The present invention also provides a process for preparation thereof and a vulcanizable composition containing the same.

16 Claims, No Drawings

FLOURINE-CONTAINING ELASTIC COPOLYMER EXCELLENT IN MOLDING PROCESSABILITY, PREPARATION PROCESS THEREOF AND VULCANIZABLE COMPOSITION EXCELLENT IN MOLDING PROCESSABILITY

TECHNICAL FIELD

The present invention relates to a process for preparing a fluorine-containing elastic copolymer being vulcanizable and excellent in molding processability, the fluorine-containing elastic copolymer prepared by the process and a vulcanizable composition having excellent molding processability and prepared by using the copolymer. Particularly, the present invention relates to the process for preparing the fluorine-containing elastic copolymer which has improved molding processability, particularly molding stability and further is excellent particularly in vulcanization properties, flowability at molding and compression set of vulcanized rubber, the fluorine-containing elastic copolymer prepared by the process and the vulcanizable composition prepared by using the copolymer.

Fluorine-containing elastic copolymers comprising vinylidene fluoride as a main component, for example, a copolymer of vinylidene fluoride-hexafluoropropylene, a terpolymer of vinylidene fluoride-hexafluoropropylene-tetrafluoroethylene, etc., can provide a vulcanized fluorine-containing rubber by vulcanizing with a vulcanizing agent comprising diamine, a vulcanizing agent comprising an organic peroxide or a vulcanizing agent prepared by combination use of a polyhydroxy aromatic compound with a quaternary phosphonium salt, a quaternary ammonium salt or the like. The vulcanized fluorine-containing rubber exhibits superior resistance to heat, oil, solvent, chemicals, etc., and has been used in the wide fields such as automobiles, ships, chemical industries, office automation apparatuses, semiconductor industries and food industries.

BACKGROUND ART

The present applicant has developed, prior to the present invention, a process for preparing a fluorine-containing elastic copolymer having remarkably improved vulcanization reactivity and compression set of the vulcanized rubber and a vulcanizable composition made from the copolymer. Namely, the process for preparing the fluorine-containing elastic copolymer is a process for preparing a copolymer of vinylidene fluoride containing 28 to 92% by mole of vinylidene fluoride unit and at least one other monomer comprising (a) polymerizing vinylidene fluoride and at least one other monomer by the use of a water-soluble radical polymerization initiator in the first stage to produce a copolymer and (b) then polymerizing in the second stage of the polymerization by the use of an oil-soluble radical polymerization initiator in the presence of the copolymer prepared in the first stage to produce a copolymer, and the vulcanizable composition of the fluorine-containing elastic copolymer is a composition prepared from the copolymer (JP-A-62391/1977 and JP-A-76359/1977). However, in all of their experimental examples thereof, an amount of the water-soluble polymerization initiators is as large as about 0.08 to 0.6% by weight, and the obtained fluorine-containing elastic copolymer is not enough for recent strict requirements with respect to improvement of processability of fluorine-containing rubbers.

One of particular requirements regarding the fluorine-containing rubbers is improvement of molding processability thereof. Since the fluorine-containing rubber is high in material cost as compared with other rubber materials, when the vulcanization speed is fast and its flowability is good, such a rubber makes it possible to produce a molded article of the fluorine-containing rubber having complicated shape effectively and to lower a total production cost. Particularly, in order to conduct injection molding which is more effective as compared with compression molding, it is required to exhibit more excellent flowability, rapid vulcanization and effective crosslinking, namely it is required that irrespective of a low viscous polymer, vulcanization can be conducted in a short period of time and yet sufficient physical properties at normal state are exhibited. On the other hand, the vulcanization accelerator comprising a quaternary phosphonium salt which is often used when the polyhydroxy aromatic compound is used as the vulcanizing agent provides a molded article exhibiting excellent compression set and large elongation at breakage. However, there are disadvantages that fine voids appear by foaming particularly when molding at a high temperature for a short period of time, which results in high percentage of defective molded articles and further that there is a possibility of causing contamination of a die due to occurrence of unvulcanized parts because of non-uniform vulcanization. Thus, there was a case where the use of such a vulcanization accelerator was restricted. The present invention provides the process for preparing a fluorine-containing elastic copolymer at a cost nearly the same as before, the fluorine-containing elastic copolymer which is prepared by the process, has highly balanced good flowability, rapid vulcanization and necessary and enough physical properties and also has molding stability which has not been obtained in conventional fluorine-containing elastic copolymers, and a vulcanizable composition which is prepared from the copolymer.

DISCLOSURE OF THE INVENTION

The present inventors have made intensive studies to obtain a fluorine-containing elastic copolymer having excellent molding processability and physical properties, and as a result, have completed the present invention. Namely, when preparing a fluorine-containing elastic copolymer containing 45 to 85% by mole of vinylidene fluoride by emulsion polymerization of a monomer mixture comprising vinylidene fluoride and at least one other monomer, there is employed a special process in which (a) in the first stage of the polymerization, the monomer mixture is polymerized in the presence of a water-soluble radical polymerization initiator to produce a copolymer, (b) then in the second stage of the polymerization the monomer mixture is polymerized in the presence of the copolymer prepared in the first stage and an oil-soluble radical polymerization initiator to produce a copolymer, an amount of the water-soluble radical polymerization initiator being controlled within a specific very small amount, that is, from 0.001 to 0.03% by weight based on the total amount of the copolymers prepared in the first and second stages. The present inventors have found that according to the process, a vulcanizable composition which has remarkably improved vulcanization speed, particularly good flowability at a molding temperature and excellent physical properties at normal state can be obtained, and have solved the above-mentioned newly arised problems. Also the present inventors have found that molded articles can be obtained stably from the vulcanizable composition even in case of combination use of the polyhydroxy aromatic compound as a vulcanizing agent and quaternary phosphonium salt as a vulcanization accelerator which has given very good physical properties in conventional fluorine-containing elastic copolymer but has caused high percentage of defective products because of generation of fine voids due to foaming and failure of fusion and further contamination of die.

BEST MODE FOR CARRYING OUT THE INVENTION

In the present invention, example of the other monomers to be copolymerized with vinylidene fluoride is, for instance, at least one of tetrafluoroethylene, trifluoroethylene, chlorotrifluoroethylene, trifluoropropylene, hexafluoropropylene, pentafluoropropylene, trifluorobutene, perfluoroalkyl perfluorovinyl ether (for example, perfluoromethyl perfluorovinyl ether and the like), ethylene or the like.

The fluorine-containing elastic copolymer obtained in the present invention contains 45 to 85% by mole of vinylidene fluoride. Typical examples thereof are, for instance, vinylidene fluoride-hexafluoropropylene copolymer, vinylidene fluoride-hexafluoropropylene-tetrafluoroethylene copolymer, vinylidene fluoride-hexafluoropropylene-ethylene copolymer, vinylidene fluoride-hexafluoropropylene-tetrafluoroethylene-ethylene copolymer, and the like.

Also as the water-soluble radical polymerization initiator, known water-soluble peroxides are usually used. Typical examples thereof are, for instance, an ammonium salt, sodium salt and potassium salt of persulfuric acid, perboric acid, perchloric acid, perphosphoric acid, percarbonic acid or the like, disuccinyl peroxide, t-butyl permaleate, t-butyl hydroperoxide and the like.

An amount of those water-soluble radical polymerization initiator influences greatly on vulcanization properties of the obtained fluorine-containing elastic copolymer and flowability at a high temperature. In order to obtain high vulcanization speed, particularly good flowability and effective crosslinked state, it is necessary to extremely decrease functional groups at the copolymer end which are derived from the water-soluble radical polymerization initiator and have adverse effect on the crosslinking. In the present invention, as mentioned above, the amount of the water-soluble radical polymerization initiator is controlled within a specific very small amount, i.e. from 0.001 to 0.03% by weight, preferably from 0.003 to 0.02% by weight based on the total amount of the copolymers prepared in the first and second stages. This very small amount is inconceivable as compared with the amount (0.15 to 0.4% by weight) which has been usually employed from the viewpoint of obtaining practicable polymerization speed in the emulsion polymerization. In the present invention, when the amount is less than 0.0 01% by weight, state of emulsion becomes unstable and an amount of polymers depositing in a tank during polymerization increases, and when the amount exceeds 0.03% by weight, the effects as mentioned above become difficult to be obtained. In the present invention, the amount of the water-soluble radical polymerization initiator is determined by its percent by weight based on expected total yield of the copolymers prepared by the polymerization in the above first and second stages.

As the oil-soluble radical polymerization initiator, known oil-soluble peroxides are usually used. Typical examples thereof are, for instance, dialkyl peroxycarbonates such as di-isopropyl peroxydicarbonate and di-sec-butyl peroxydicarbonate, peroxyesters such as t-butyl peroxy isobutylate and t-butyl peroxypivalate, dialkyl peroxides such as di-t-butyl peroxide and the like. The amount thereof is not limited, but because it influences on a molecular weight and polymerization rate of the fluorine-containing elastic copolymer, it is preferable to control at 0.1 to 3.0% by weight on the basis of the copolymer.

The polymerization of the present invention is carried out through usual emulsion polymerization. The polymerization can be carried out at a temperature ranging from 5° to 120° C., preferably from 40° to 100° C. in both the first and second stages. However, in order to reduce an amount of functional groups at the copolymer end, it is preferable to adjust the polymerization temperature of the first stage to 600° to 100° C. and the temperature of the second stage to 40° to 70° C., that is, to make the temperature of the second stage equal to or lower than the temperature of the first stage, thereby making it possible to decrease decomposition of the residual water-soluble radical polymerization initiator of the first stage. The polymerization can be carried out at a pressure ranging from 5 to 100 kg/cm²G, preferably from 10 to 70 kg/cm²G. When the pressure is lower than 5 kg/cm²G, the polymerization rate is low and productivity is worse, and when higher than 100 kg/cm²G, an auxiliary equipment only becomes necessary and there is no great merit. Kind and amount of monomers used in the first and second stages of the polymerization may be the same or, may be different depending on desired purposes.

In the polymerization, a known emulsifying agent can also be used usually both in the first and second stages, but if possible, it is necessary not to use the emulsifying agent because it has an adverse effect on the vulcanization. It is desirable to control an amount of the emulsifying agent to minimum only for inhibiting the deposition of the polymer at polymerizing, etc.

In the polymerization process of the present invention, it is usually possible to use a known chain transfer agent for the purpose of adjusting molecular weight. As the chain transfer agent, there can be used advantageously hydrocarbons having 4 to 6 carbon atoms, alcohols, ethers, organic halides (for example, $CCl_4$, $CBrCl_3$, $CF_2BrCF_2Br$, $ICH_2I$, $ICF_2I$ and $I(CF_2)_4I$) and the like.

The vulcanizable composition of the present invention is one prepared by adding a known acid acceptor and vulcanizing agent to the fluorine-containing elastic copolymer obtained by the above-mentioned specific polymerization process. As the acid acceptor, a known metal oxide and metal hydroxide can be used alone or in a mixture thereof. With respect to the vulcanizing agent, it is particularly preferable to employ so-called amine vulcanization method by using a polyamine compound and so-called polyol vulcanization method by a combination use of a polyhydroxy aromatic compound with a quaternary phosphonium salt and/or quaternary ammonium salt. Among them, from a point of endowing molded articles with excellent compression set and large elongation at break, it is preferable to use a combination of at least one of the polyhydroxy aromatic compounds as the vulcanizing agent and at least one of the quaternary phosphonium salts as the vulcanization accelerator.

Typical examples of the polyamine compound are, for instance, hexamethylenediamine carbamate, N,N-dicinnamylidene-1,6-hexamethylenediamine and the like. Typical examples of the polyhydroxy aromatic compound are, for instance, hydroquinone, 2,2-bis(4-hydroxyphenyl) propane[bisphenol A], 2,2-bis(4-hydroxyphenyl) perfluoropropane[bisphenol AF], 2,2-bis(4-hydroxyphenyl) butane[bisphenol B] and the like. Typical examples of the quaternary phosphonium salt are, for instance, tetrabutylphosphonium chloride, benzyltriphenylphosphonium chloride, benzyltrimethylphosphonium chloride, benzyltributylphosphonium chloride, and the like. Typical examples of the quaternary ammonium salt are, for instance, tetrabutylammonium chloride, benzyltrimethylammonium chloride, benzyltrioctylammonium chloride, 8-methyl-1,8-diazabicyclo(5.4.0)-7-undecenium chloride, 8-benzyl-1 8-diazabicyclo(5.4.0)-7-undecenium chloride and the like.

It is usually possible to further add a known filler, processing aid and the like to the vulcanizable composition obtained from the fluorine-containing elastic copolymer of the present invention. There is no particular restriction as to the mixing method thereof, and any known method is usually employed.

The molding processability and molding stability which are effects of the present invention mean that very fine voids which arise due to partly insufficient vulcanization are very few and adhesion of an unvulcanized rubber to a die is very little. To increase productivity in molding process, a large number of various molded articles are usually produced in one batch at a high temperature for a short period of time. However, the substantial molding conditions of each article are greatly different. Namely, there are great differences in a temperature distribution of the die, time distribution for the period from charging into the die upto completion of the molding, molding pressure distribution, etc. Therefore it is desired that a range of allowable vulcanization conditions of the vulcanizable composition is wide. Particularly, in the case of the combination of the polyhydroxy aromatic compound and quaternary phosphonium salt, when usual fluorine-containing elastic copolymer is used, it can be expected that the percentage of defectives increases because the above-mentioned allowable range is narrow. Thus practically it is required to turn the vulcanization conditions toward the gentle condition, namely the vulcanizing time has been prolonged. According to the present invention, since the fluorine-containing elastic copolymer has an unexpected small amount of the ionic ends of the copolymer which are derived from the water-soluble radical polymerization initiator and give an adverse effect on vulcanization, the obtained composition exhibits an excellent molding stability.

The present invention is then explained by means of Examples and Comparative Examples.

EXAMPLE 1

Yields of copolymers were set at 1 kg for the first stage and at 9 kg for the second stage (10 kg in total).
(Polymerization in the first stage)

A 45-liter polymerization tank was charged with 26 liters of pure water. After the inside of the polymerization tank was replaced by nitrogen gas sufficiently, 1,090 g of a monomer mixture of vinylidene fluoride(VdF)-hexafluoropropylene (HFP) (molar ratio of 50:50) was added and the inside temperature of the tank was raised to 80° C. with stirring. Then 1.1 g of isopentane (hereinafter referred to as "IP") as a chain transfer agent and 2.1 g of ammonium persulfate (water-soluble radical polymerization initiator, hereinafter referred to as "APS") dissolved in 100 ml of pure water were fed under pressure in turns with nitrogen gas to initiate the polymerization.

The pressure decreased as the polymerization advanced, and thus the VdF/HFP monomer mixture (molar ratio of 78:22) was fed under pressure successively to maintain the reaction pressure at 15 kg/cm$^2$G. After the reaction was continued for 150 minutes, the heating and stirring were stopped and then the monomer in the system was discharged to terminate the reaction.

A concentration of the thus obtained aqueous emulsion was 3.6% by weight and an amount of the copolymer contained therein was 970 g. The copolymer was taken out from a part of the aqueous emulsion by a known method and a number average molecular weight (Mn) was measured by GPC. The Mn was $7.80 \times 10^4$.
(Polymerization in the second stage)

Since the aqueous emulsion obtained by the polymerization reaction in the first stage contained unreacted APS, the aqueous emulsion was treated with an activated carbon to decompose the unreacted APS.

The total amount of the treated aqueous emulsion was charged again into the 45-liter polymerization tank. After the inside of the tank was replaced by nitrogen gas sufficiently, a pressure in the system was increased to 15 kg/cm$^2$ at a temperature of 60° C. with a VdF/HFP monomer mixture (molar ratio of 50:50). Then 45 g of di-isopropyl peroxydicarbonate (oil-soluble radical polymerization initiator, hereinafter referred to as "IPP") was fed under pressure to the tank with nitrogen gas to initiate the polymerization. The pressure decreased as the polymerization advanced, and thus the VdF/HFP monomer mixture (molar ratio of 78:22) was fed under pressure successively to maintain the reaction pressure at 15 kg/cm$^2$G. After the reaction was continued for 250 minutes, the heating and stirring were stopped and the monomer in the system was discharged to terminate the reaction.

A concentration of the thus obtained aqueous emulsion was 24.0% by weight and yield of the copolymer was 9,690 g. The fluorine-containing elastic copolymer was taken out from a part of the aqueous emulsion by a known method and a number average molecular weight was measured by GPC. The Mn was $9.29 \times 10^4$. Mooney viscosity (ML1+10, 100° C.) was 65. The components of the fluorine-containing elastic copolymer were VdF/HFP=76.3/23.7.

The number average molecular weight Mn of the fluorine-containing elastic copolymer was obtained by GPC (polystyrene standard).
<Conditions of measurement for number average molecular weight>

GPC: High performance GPC apparatus HLC-8020 [available from Toso Kabushiki Kaisha]

Column: TSK guard column HHR-H (single column) TSK gel-G5000H, -G4000H, -G3000H, -G2000H (single column each) [available from Toso Kabushiki Kaisha]

Detector: RI detector (differential reflectometer)

Developing solvent: Tetrahydrofuran

Temperature: 35° C.

Concentration: 0.5% by weight

Standard polystyrene:
Various monodisperse polystyrenes (Mw/Mn=1.14 (max))
TSK standard POLYSTYRENE [available from Toso Kabushiki Kaisha]

EXAMPLES 2 AND 3

Polymerization was carried out in the same manner as in Example 1 except that yield of a copolymer in the first stage was set at 300 g, yield of a copolymer in the second stage was set at 9.7 kg and the amounts of APS, IP and IPP shown in Table 1 were employed, to give a fluorine-containing elastic copolymer.

EXAMPLE 4

Yields of copolymers were set in the same manner as in Example 2.

(Polymerization in the first stage)

A 45-liter polymerization tank was charged with 26 liters of pure water. After the inside of the polymerization tank was replaced by nitrogen gas sufficiently, 830 g of a monomer mixture of VdF-HFP-tetrafluoroethylene (TFE) (molar ratio of 63:32:5) was added thereto and the inside temperature of the tank was raised to 80° C. with stirring. Then 0.5 g of IP as a chain transfer agent and 0.46 g of APS dissolved in 100 ml of pure water were fed under pressure with nitrogen gas to initiate the polymerization.

The pressure decreased as the polymerization advanced, and thus the VdF/HFP/TFE monomer mixture (molar ratio of 77:17:6) was fed under pressure successively to maintain the reaction pressure at 13 kg/cm$^2$G. After the reaction was continued for 67 minutes, the heating and stirring were stopped and then the monomer in the system was discharged to terminate the reaction.

A concentration of the thus obtained aqueous emulsion was 1.1% by weight and an amount of the copolymer contained therein was 290 g. The fluorine-containing elastic copolymer was taken out from a part of the aqueous emulsion by a known method and a number average molecular weight was measured by GPC. The Mn was $8.6 \times 10^4$.

(Polymerization in the second stage)

Since the aqueous emulsion obtained by the polymerization reaction in the first stage contained unreacted APS, the aqueous emulsion was treated with an activated carbon to decompose the unreacted APS.

The total amount of the treated aqueous emulsion was charged again into the 45-liter polymerization tank. After the inside of the tank was replaced by nitrogen gas sufficiently, a pressure in the system was increased to 9 kg/cm$^2$G at a temperature of 60° C. with a VdF/HFP/TFE monomer mixture (molar ratio of 77:17:6). Then 80 g of IPP was fed under pressure to the tank with nitrogen gas to initiate the polymerization. The pressure decreased as the polymerization advanced, and thus the VdF/HFP/TFE monomer mixture (molar ratio of 77:17:6) was fed under pressure successively to maintain the reaction pressure at 9 kg/cm$^2$G. After the reaction was continued for 200 minutes, the heating and stirring were stopped and the monomer in the system was discharged to terminate the reaction.

A concentration of the thus obtained aqueous emulsion was 26.3% by weight and yield of the copolymer was 9,620 g. The fluorine-containing elastic copolymer was taken out from a part of the aqueous emulsion by a known method and a number average molecular weight was measured by GPC. The Mn was $9.2 \times 10^4$. Mooney viscosity (ML1+10, 100° C.) was 68. The components of the fluorine-containing elastic copolymer were VdF/HFP/TFE=77.1/16.2/6.7% by mole.

Comparative Example 1

Polymerization was carried out in the same manner as in Example 1 except that yield of a copolymer in the first stage was set at 4 kg, yield of a copolymer in the second stage was set at 6 kg and the amounts of APS, IP and IPP shown in Table 1 were employed, to give a fluorine-containing elastic copolymer.

Comparative Example 2

A fluorine-containing elastic copolymer was obtained without using the two-stage polymerization process shown in Examples 1 to 4. A 45-liter polymerization tank was charged with 26 liters of pure water. After the inside of the polymerization tank was replaced by nitrogen gas sufficiently, 1,050 g of a VdF-HFP monomer mixture (molar ratio of 50:50) was added and the inside temperature of the tank was raised to 80° C. with stirring. Then 4.0 g of IP as a chain transfer agent and 14.5 g of APS dissolved in 100 ml of pure water were fed under pressure with nitrogen gas to initiate the polymerization. At the same time, previously prepared APS solution of a concentration of 37 g/liter was fed at a rate of 3 ml/min until the completion of the polymerization. The pressure decreased as the polymerization advanced, and thus the VdF/HFP monomer mixture (molar ratio of 78:22) was fed under pressure successively to maintain the reaction pressure at 12 kg/cm$^2$G. After the reaction was continued for 222 minutes, the heating and stirring were stopped and the monomer in the system was discharged to terminate the reaction.

A concentration of the thus obtained aqueous emulsion was 27.1% by weight and yield of the copolymer was 9,680 g. The fluorine-containing elastic copolymer was taken out from a part of the aqueous emulsion by a known method and a number average molecular weight was measured by GPC. The Mn was $9.1 \times 10^4$. Mooney viscosity (ML1+10, 100° C.) was 66. The components of the fluorine-containing elastic copolymer were VdF/HFP/TFE=78.1/21.9. The polymerization conditions, etc. are shown in Table 1.

TABLE 1

|  | Ex. 1 | Ex. 2 | Ex. 3 | Ex. 4 | Com. Ex. 1 | Com. Ex. 2 |
|---|---|---|---|---|---|---|
| First stage |  |  |  |  |  |  |
| Polymerization pressure (kg/cm$^2$) | 15 | 15 | 15 | 13 | 15 | 12 |
| Polymerization temperature (°C.) | 80 | 80 | 80 | 80 | 80 | 80 |
| APS[1] (g) | 2.1 | 0.67 | 0.67 | 0.46 | 5.7 | 39 |
| IP[2] (g) | 1.1 | — | — | 0.5 | 0.5 | 4.0 |
| Polymerization time (hour) | 2.5 | 1.5 | 1.6 | 1.1 | 2.6 | 3.7 |
| Yield of copolymer in the first stage (g) | 970 | 310 | 300 | 290 | 3960 | 9700 |
| GPC Number average molecular weight Mn × 10$^{-4}$ | 7.8 | 12.0 | 12.5 | 8.6 | 14.9 | 9.1 |
| Second stage |  |  |  |  |  |  |
| Polymerization pressure (kg/cm$^2$) | 15 | 15 | 15 | 9 | 15 | — |
| Polymerization temperature (°C.) | 60 | 60 | 60 | 60 | 60 | — |
| Perloyl IPP[3] (g) | 45 | 45 | 83 | 45 | 39 | — |
| Polymerization time (hour) | 4.2 | 4.8 | 3.6 | 3.3 | 2.8 | — |
| Fluorine-containing elas- |  |  |  |  |  |  |

TABLE 1-continued

|  | Ex. 1 | Ex. 2 | Ex. 3 | Ex. 4 | Com. Ex. 1 | Com. Ex. 2 |
|---|---|---|---|---|---|---|
| tic copolymer |  |  |  |  |  |  |
| Total yield of copolymer (g) | 9690 | 10290 | 9850 | 9620 | 9720 | 9700 |
| GPC Number average molecular weight Mn × 10$^{-4}$ | 9.3 | 9.5 | 5.8 | 9.2 | 6.7 | 9.1 |
| Mooney viscosity ML1 + 10 (100° C.) | 65 | 65 | 24 | 68 | 62 | 66 |
| Components of polymer (mol %) VdF/HFP/TFE | 76.3/23.7/0 | 76.5/23.5/0 | 77.9/22.1/0 | 77.1/16.2/6.7 | 77.2/22.8/0 | 78.1/21.9/0 |
| Amount of APS based on total yield of copolymer (% by weight) | 0.022 | 0.0065 | 0.0068 | 0.0048 | 0.059 | 0.40 |

[1]Ammonium persulfate
[2]Isopentane
[3]Di-isopropyl peroxydicarbonate

Experiments 1 to 7 for Vulcanization

To 100 parts by weight of the fluorine-containing elastic copolymers obtained in Examples 1 to 4 and Comparative Examples 1 and 2 were added the additives shown in Table 2 in turns in amounts shown in Table 2 with water-cooling, followed by kneading on rubber rolls. The mixture was allowed to stand over day and night for maturing. The obtained vulcanizable composition was, after re-kneading for enhancing re-dispersibility, subjected to sheeting, and cut to a given shape, followed by charging in a die and press-vulcanizing at 170° C. for 10 minutes to produce a 2 mm thick sheet and an O ring (P-24). Then in an electric oven, the molded sheet and O ring were treated at 230° C. for 24 hours to terminate the vulcanization in the oven.

With respect to the thus obtained vulcanized rubber sheet and ring, physical properties at normal state and compression set (CS) were measured (in accordance with JIS K 6301). Also with respect to each vulcanizable composition, a vulcanization curve at 170° C. was determined by a JSR type model II Curastometer to give a minimum viscosity (ML), degree of vulcanization (MH), induction time (T10) and optimum vulcanization time (T90).

The vulcanizable composition of the present invention has particularly rapid vulcanization and good flowability as compared with those of conventional ones. Also it was confirmed that it is possible to easily vulcanize low molecular weight fluorine-containing elastic copolymers which have been considered to be unvulcanizable. The results are shown in Table 2.

TABLE 2

|  | Experiment for vulcanization |  |  |  |  |  |  |
|---|---|---|---|---|---|---|---|
|  | 1 | 2 | 3 | 4 | 5 | 6 | 7 |
| Composition (parts by weight) |  |  |  |  |  |  |  |
| Fluorine-containing elastic copolymer (copolymer used) | 100 (Ex. 1) | 100 (Ex. 2) | 100 (Ex. 3) | 100 (Ex. 4) | 100 (Com. Ex. 1) | 100 (Com. Ex. 2) | 100 (Com. Ex. 2) |
| Bisphenol AF | 1.5 | 1.5 | 1.5 | 1.5 | 1.5 | 1.5 | 1.5 |
| BTPPC[1] | 0.35 | 0.35 | — | — | 0.35 | 0.35 | 0.60 |
| DBU-B[2] | — | — | 0.25 | 0.35 | — | — | — |
| N990[3] | 20 | 20 | 20 | 20 | 20 | 20 | 20 |
| MA-150[4] | 3 | 3 | 3 | 3 | 3 | 3 | 3 |
| CALDIC#2000[5] | 6 | 6 | 6 | 6 | 6 | 6 | 6 |
| Vulcanization properties (170° C.) |  |  |  |  |  |  |  |
| ML (kg · f) | 0.22 | 0.21 | 0.03 | 0.25 | 0.24 | 0.25 | 0.25 |
| MH (kg · f) | 3.15 | 3.40 | 1.88 | 3.50 | 3.00 | 3.10 | 3.21 |
| T10 (min) | 1.5 | 1.4 | 1.5 | 1.7 | 2.0 | 2.7 | 1.5 |
| T90 (min) | 2.0 | 1.8 | 2.3 | 2.3 | 2.9 | 4.8 | 2.0 |
| Physical properties at normal state |  |  |  |  |  |  |  |
| M100 (kg/cm$^2$) | 30 | 29 | 31 | 35 | 32 | 33 | 34 |
| TB (kg/cm$^2$) | 145 | 147 | 129 | 170 | 155 | 150 | 148 |
| EB (%) | 330 | 330 | 300 | 300 | 330 | 320 | 300 |
| HS | 68 | 67 | 71 | 70 | 69 | 70 | 70 |
| CS (%) 200° C. × 70 hour | 20 | 19 | 27 | 21 | 19 | 20 | 23 |

[1]Benzyltriphenylphosphonium chloride
[2]8-Methyl-1,8-diazabicyclo(5.4.0)-7-undecenium chloride
[3]THERMAX N-990 (available from CANCARB Co.)
[4]Magnesium oxide (available from Kyowa Kagaku Kogyo Kabushiki Kaisha)
[5]Calcium hydroxide (available from Ohmi Kagaku Kogyo Kabushiki Kaisha)

Experiments 1 to 4 for Molding-Stability

The vulcanizable compositions obtained in Experiments 1, 2, 6 and 7 for vulcanization were press-molded at 180° C. for 3, 5 and 7 minutes, respectively by using a die for 65 pieces of O rings (P-8), and the molding stability was evaluated by the number of O ring dies which were recognized to have been contaminated by molding failure caused due to fusion failure and voids.

The above-mentioned evaluation was carried out under the molding conditions which were so set that the fusion failure of the O ring was easy to arise, i.e. by neither using a mold-releasing agent nor carrying out air venting. Therefore, though the fusion failure was observed to all the vulcanizable compositions, above all the vulcanizable compositions of the present invention indicate that vulcanization was advanced stably with almost no contamination even if benzyltriphenylphosphonium chloride which is poor in molding stability was used. The number of contaminated dies was counted with naked eyes. The results are shown in Table 3.

TABLE 3

| | Experiment for molding stability | | | |
|---|---|---|---|---|
| | 1 | 2 | 3 | 4 |
| | Vulcanizable composition | | | |
| Number of contaminated dyes | Experiment 1 for vulcanization | Experiment 2 for vulcanization | Experiment 6 for vulcanization | Experiment 7 for vulcanization |
| 180° C. × 3 min | 3 | 2 | 13 | 11 |
| 180° C. × 5 min | 2 | 0 | 6 | 5 |
| 180° C. × 7 min | 0 | 0 | 2 | 1 |

Industrial Applicability

The fluorine-containing elastic copolymer obtained according to the process for preparation of the present invention is, when used as the vulcanizable composition, excellent in molding processability, particularly molding stability, and further is excellent in vulcanization properties, flowability at molding and compression set of a vulcanized rubber.

We claim:

1. A process for preparing a fluorine-containing elastic copolymer containing 45 to 85% by mole of vinylidene fluoride and having excellent molding processability, by emulsion-polymerizing a monomer mixture comprising vinylidene fluoride and at least one of other monomers, characterized in that
   (a) in the first stage of the polymerization, said monomer mixture is polymerized in the presence of a water-soluble radical polymerization initiator to prepare a copolymer and
   (b) in the second stage of the polymerization, said monomer mixture is polymerized in the presence of said copolymer and an oil-soluble radical polymerization initiator to prepare a copolymer and that said water-soluble radical polymerization initiator is used in an amount of 0.001 to 0.03% by weight based on the total weight of the copolymers prepared in the first and second stages.

2. The process of claim 1, wherein said water-soluble radical polymerization initiator is used in an amount of 0.003 to 0.02% by weight based on the total weight of the copolymers prepared in the first and second stages.

3. The process of claim 1 or 2, wherein polymerization temperatures in the first stage and in the second stage are from 60° to 100° C. and from 40° to 70° C., respectively and the polymerization temperature in the second stage is equal to or lower than that in the first stage.

4. The process of claim 2, wherein polymerization temperatures in the first stage and in the second stage are from 60° to 100° C. and from 40° to 70° C., respectively and the polymerization temperature in the second stage is equal to or lower than that in the first stage.

5. A fluorine-containing elastic copolymer obtained by the process of claim 1.

6. A fluorine-containing elastic copolymer obtained by the process of claim 2.

7. A fluorine-containing elastic copolymer obtained by the process of claim 3.

8. A fluorine-containing elastic copolymer obtained by the process of claim 4.

9. A vulcanizable composition which has excellent molding processability and is prepared by adding an acid acceptor and a vulcanizing agent to the fluorine-containing elastic copolymer of claim 5.

10. A vulcanizable composition which has excellent molding processability and is prepared by adding an acid acceptor and a vulcanizing agent to the fluorine-containing elastic copolymer of claim 6.

11. A vulcanizable composition which has excellent molding processability and is prepared by adding an acid acceptor and a vulcanizing agent to the fluorine-containing elastic copolymer of claim 7.

12. A vulcanizable composition which has excellent molding processability and is prepared by adding an acid acceptor and a vulcanizing agent to the fluorine-containing elastic copolymer of claim 8.

13. The vulcanizable composition of claim 9, which contains at least one polyhydroxy aromatic compound as the vulcanizing agent and at least one quaternary phosphonium salt as a vulcanization accelerator.

14. The vulcanizable composition of claim 10, which contains at least one polyhydroxy aromatic compound as the vulcanizing agent and at least one quaternary phosphonium salt as a vulcanization accelerator.

15. The vulcanizable composition of claim 11, which contains at least one polyhydroxy aromatic compound as the vulcanizing agent and at least one quaternary phosphonium salt as a vulcanization accelerator.

16. The vulcanizable composition of claim 12, which contains at least one polyhydroxy aromatic compound as the vulcanizing agent and at least one quaternary phosphonium salt as a vulcanization accelerator.

* * * * *